United States Patent Office 3,816,579
Patented June 11, 1974

3,816,579
METHOD FOR BLOW MOLDING HOLLOW
ARTICLES
Ernest P. Moslo, 12700 Lake Ave.,
Lakewood, Ohio 44107
Original application Feb. 26, 1970, Ser. No. 14,310, now
Patent No. 3,664,798, dated May 23, 1972. Divided
and this application Feb. 18, 1972, Ser. No. 227,576
Int. Cl. B29c 17/07
U.S. Cl. 264—97    9 Claims

ABSTRACT OF THE DISCLOSURE

A method for producing hollow articles of plastic or the like such as, for instance, plastic bottles having a configured or threaded neck section and a substantially smooth surfaced, generally vertically oriented body section. The method includes forming a parison in a parison mold and then indexing the parison and moving the latter vertically into a blow mold for vertically blowing the article in the blow mold. The molds comprise a movable or expandable neck mold portion for forming the configured neck section of the molded article, and a body mold portion for forming the body section of the molded article. The body mold portion of the blow mold also includes a movable end wall defining the bottom of the body section of the molded article, and after blowing or formation of the article is accomplished, the end wall of the body mold portion is moved out of interfering relation and the neck mold portion is opened or expanded, to permit ejection of the molded article vertically out of the blow mold. Means may be provided movable into coaction with the open-ended blow mold after movement of the end wall out of interfering relation, for directing the molded article to any desired location. Injection of the plastic material into the parison mold is preferably accomplished vertically to form the aforementioned parison. The end result is a method requiring a minimum of floor space.

This application is a divisional patent application of copending U.S. application Ser. No. 14,310, filed Feb. 26, 1970 in the name of Ernest P. Moslo and entitled Parison-Type Bottle Blowing Machine, now Pat. 3,664,798, dated May 23, 1972.

This invention relates in general to a method for blow molding hollow articles and more particularly to a blow molding method which is operable vertically for formation of the molded articles, and which utilizes molds provided with expansible or movable neck cavity sections and movable end wall sections of the body portion of the blow mold, for providing for generally vertical removal of the molded article from the blow mold cavity resulting in a highly compact operation requiring a minimum of floor space.

BACKGROUND OF THE INVENTION

U.S. Pat. No. 3,116,516 issued Jan. 7, 1964, to Ernest P. Moslo discloses a bottle blowing machine of the parison type for automatic production of plastic bottles and the like. The machine of such patent comprises three molds positioned side-by-side with generally horizontally extending parison core rods adapted to be selectively disposed within adjacent pairs of the molds so that when the core rods are disposed in such adjacent molds, the molds may be closed. The central mold of the group is adapted for injection molding of parisons upon the associated core rods and the laterally disposed side molds are adapted for blow molding of the finished articles. After the blowing operation, the molds are opened and the core rods are raised with the finished articles then ejected horizontally from the group of core rods associated with the blow mold.

In U.S. Pat. 3,480,994 dated Dec. 2, 1969, there is disclosed a parison-type blow molding machine of the above discussed general type having movable rear wall sections of the blow mold portions of the machine (such rear wall sections defining the bottom of the bottle) so that the rear wall sections may be moved rearwardly relative to an indented bottom wall of a formed bottle, so that the formed article may be raised vertically from the open blow mold without interference of the indented bottom wall of the formed article with the blow mold. Such prior art machines are generally horizontally arrayed and require considerable floor space.

SUMMARY OF THE INVENTION

The present application discloses a parison-type blow molding machine in which injection of the hot plastic material into the parison mold to form the parison is accomplished vertically and ejection of the formed articles from the machine is accomplished vertically, resulting in a relatively compact operation which requires materially less floor space and provides for vertically molding configured or threaded neck sections and indented bottom wall sections on the formed article, such as a bottle.

Accordingly, an object of the invention is to provide a novel method for forming plastic bottles or the like.

Another object of the invention is to provide a method of the aforediscussed type wherein the molds utilized include laterally movable or expandable neck mold sections and a movable end wall section for forming the bottom of the molded article, so that the neck mold section at the blow mold station can be moved out of interfering relation with the configured or threaded neck section of the formed article and the bottom wall portion of the blow mold can be moved out of interfering relation with the underside of the formed article, to permit expeditious vertical ejection of the article from the blow mold.

A still further object of the invention is to provide a method of the latter type which may include utilization of chute means adapted for coaction with the open ended blow mold after movement of the end wall out of interfering relation with the blown article for directing the latter to a location, and wherein the chute means is operatively connected to the movable bottom wall section of the blow mold so that when the bottom wall section is moved out of interfering relation with the blown article in the blow mold, the chute means is positioned in coacting relation with the open ended blow mold for receiving therein the blown article, upon ejection of the latter from the blow mold.

A still further object of the invention is to provide a method of the above discussed type wherein conveyor means may be utilized coacting with the chute means for conveying the formed articles away from the molding machine after receiving the articles from the chute means.

A still further object of the invention is to provide a method of the above-discussed type wherein the neck forming portion of a blow mold may be provided with power means for expanding the neck portion laterally to permit the aforementioned vertical ejection of formed articles from the blow mold.

Other objects and advantages of the invention will be apparent from the following description taken in conjunction with the accompanying drawings wherein:

FIG. 3 is a top plan view of the machine of FIGS. 1 and 2;

Referring now again to the drawings, the parison type blow molding machine for producing hollow articles such as plastic bottles, comprises a base 10 supporting a bed plate 12. Generally vertical uprights 14 project upwardly from bed 12 and support head portion 16 of the machine. Head portion 16 of the machine supports the vertically extending mold clamp assembly 18 which moves the mold neck portions toward and away from the mold body portions and which changes the mold portions together in the closed condition of the molds.

Mold clamp assembly 18 includes movable platen 20 which supports on its underside the laterally expansible or openable neck ring mold assemblies 22, 24 (FIGS. 1 and 8) which are adapted for mating coaction with the underlying body mold portions 26, 26a, and 26b. Mold portion 26 is a parison mold station and mold portions 26a, 26b are blow mold stations.

Movable platen 20 is guided in its vertical movement by four extendable guide rails 27 depending from relative stationary platen 28. Stationary platen 28 is mounted for transverse movement on the head 16 and as by means of transversely extending rails 30 supported by brackets 30a on head 16. As can be seen in FIG. 3, the head 16 is provided with a transversely extending opening 32 therein through which extends the mold clamp assembly 18. A double-acting fluid powered motor unit 34 (FIGS. 1, 2 and 3) may be attached to the head 16 and may be coupled as by means of its piston rod 34a to the platen 28 for moving the whole mold clamp assembly 18 transversely. Thus the mold clamp assembly and the associated neck mold portions 22, 24 can be moved from the right hand position of FIG. 1 wherein the neck mold portions overlie the underlying body mold portions of the blow station 26a and parison mold station 26, to a left hand position wherein the neck mold portion 24 would overlie the blow mold station 26b while the neck mold portion 22 would overlie the parison mold station 26. This operational movement will be hereinafter described in greater detail.

Figure 6:
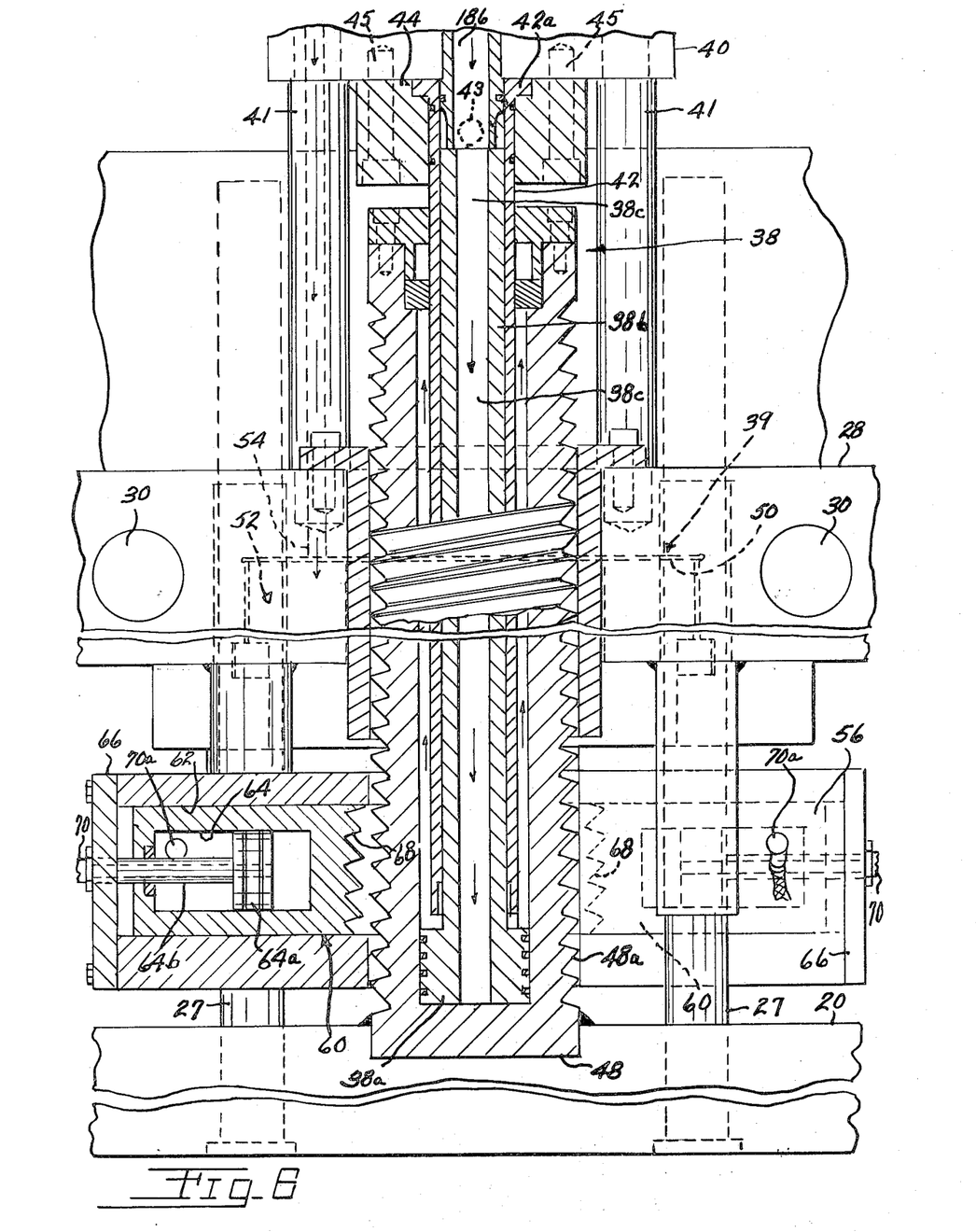
FIG. 6 is an enlarged, fragmentary, sectional illustration taken generally along the plane of line 6—6 of FIG. 3 of the clamping mechanism for moving the neck mold portions of the molds toward and away from engaged aligned coaction with the body portions of the molds, and for clamping the mold portions together during the molding operation.

The mold clamp assembly 18 may be comprise a primary fluid-powered motor unit 38. Motor unit 38 is adapted to provide the primary closing and opening movements of the movable platen 20 and comprises a piston 38a and attached piston rod 38b (FIG. 6). Piston rod 38b is of generally hollow construction with a passage 38c extending for the full length of the rod. Rod 38b may be anchored adjacent one end thereof to a support plate 40. Plate 40 is secured to tie bars 41 which are in turn secured to and supported on member 28. The exterior of the piston rod 38b may be splined or slotted in a direction axially thereof, to provide for passage of actuating fluid between the exterior of rod 38b and a sleeve 42 encircling rod 38b.

Sleeve member 42 (FIG. 6) which may be of generally cylindrical construction is anchored as at 42a to a manifold member 44 which in turn is secured as by means of the bolts 45 to the end plate 40. Cylinder member 48 of primary actuating unit 38 is serrated on the exterior thereof as at 48a, with such serrations comprising a helical thread which may be of the buttressed type. The threads 48a extend for substantially the full length of the cylinder member 48 and are adapted for use in clamping the secondary actuating unit 39 of the mold clamp assembly to the vertically movable cylinder 48 of the primary actuating means of the mold clamp assembly. The lower end of cylinder 48 is attached to the vertically movable platen 20 as by welding or any other suitable means.

Platen 28 mounts the secondary actuating unit 39 which includes a chamber 50 formed in platen 28 in which is disposed for axial movement a piston 52. Piston 52 in the embodiment illustrated encircles cylinder 48. Piston 52 is of a considerable larger size as compared to the piston 38a of the primary actuating means, with the piston 52 of the secondary actuating means being adapted to apply high pressure clamping force to the mold portions after the initial closing thereof. Such secondary actuating means may be of the single acting type and a port 54 (FIG. 6) may be provided communicating with the chamber 52 for supplying pressurized actuating fluid to and from chamber 52.

A clamping jaw supporting member 56 may be secured as by means of bolts 56a (FIG. 1) to the piston member 52, for movement therewith. Clamping jaw support member 56 has centrally located axial opening 58 (FIG. 6) extending completely therethrough and through which projects the serrated cylinder 48 of the primary actuating unit 38. Jaw clamps 60 are mounted for movement in member 56 on opposite sides of cylinder 48, and are adapted for mating coaction with the serrated exterior of cylinder member 48 for applying the force of the secondary motor unit 39 to the vertically movable cylinder member 48 and thus to the movable platen 20. As can be best seen in FIG. 6, the clamping jaws 60 are mounted for slidable movement in a transverse opening 62 in support member 56. Each of the jaws has an internal cylindrical section 64 with a piston 64a disposed therein with the piston rod 64b anchored to the respective end plate 66 of the support member 56. The jaws are complementarily serrated, as at 68, with the serrations 48a on the cylinder 48 of the primary actuating unit. It can be seen that by applying pressurized actuating fluid via port 70 to the cylindrical chamber 64 of the respective jaw, the jaws are moved inwardly into clamping coaction with the cylinder 48. Applying fluid pressure via the associated port 70a causes the respective jaws to move outwardly away from clamping coaction with the cylinder 48. When the jaws are moved into engaging coaction with the exterior of the cylinder 48, the jaws are interlocked with the primary actuating unit 38 thus interlocking the secondary actuating unit 39 including the piston 52 thereof, to the movable cylinder 48 of the primary actuating unit. Accordingly, when fluid pressure is introduced via port 54 into the chamber 52 of the secondary actuating unit 39, this will cause application of high pressure to piston 52 thereof in the outward direction of movement of the piston, and thus cause application of high pressure to the movable platen 20 in a direction toward the bed 12, thus applying high pressure to the closed molds, and prevent separation of the mold sections during injection of stock material into the parison molds and during the blowing or forming of the bottles in the blow molds. The fluid actuating pressure applied to the primary actuating unit may be in the order 150 p.s.i. to 200 p.s.i. while the fluid pressure applied to the secondary actuating unit may be in the order of 2,000 p.s.i. Reference may be had to U.S. patent application Ser. No. 612,438, filed Jan. 30, 1967, now Pat. No. 3,505,708 under the name of Ernest P. Moslo and entitled Fluid-Powdered Actuating Clamp for Molding Apparatus for a more detailed discussion of a mold clamping assembly of the aforediscussed general type.

Figure 7:
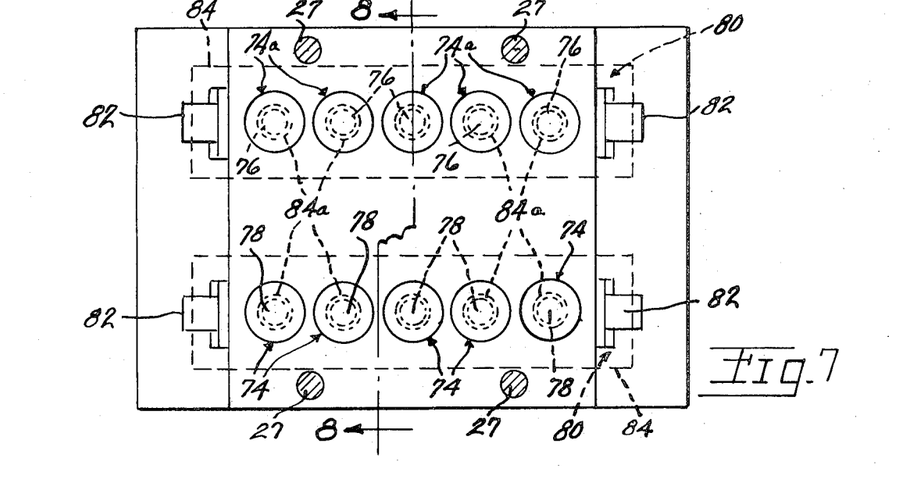
FIG. 7 is a reduced size view taken generally along the plane of line 7—7 of FIG. 2, illustrating the paired groups of core rod assemblies adapted for coaction with the parison and blow mold cavities, for molding more one than one article at a time on the machine.

The aforementioned movable platen 20 supports or mounts the core rod assemblies 74, 74a (FIGS. 7 and 8) therein. In the position of the core rod assemblies illustrated in FIGS. 1 and 2, the core rods 76 associated with the right-hand core rod assemblies 74a are positioned over the right-hand blow mold portions 26a while the core rods 78 of core rod assemblies 74 are positioned over the parison mold portions 26. When the transverse motor unit 34 is actuated thereby shifting the stationary platen 28 and supported mold clamp assembly 18 all the way left of the right-hand position illustrated in FIG. 1, the core rods 78 of the left-hand core rod assemblies 74 would be disposed over the left-hand blow mold portions 26b while simultaneously the core rods 76 of core assemblies 74a would be disposed over the parison mold portions 26.

A stripper mechanism 80 is associated with each group of core rod assemblies.. Such stripper mechanisms 80 are mounted on the movable platen 20 and are actuated by means of a pair of double acting, reciprocal preferably fluid powdered motor units 82 (FIGS. 1 and 7) disposed on opposite sides of platen 20. Each stripper mechanism 80 comprises a stripper plate 84 (FIGS. 2 and 8) having a row of aligned stripper rings 84a (FIGS. 7 and 8), each one of which encircles a respective core rod (76 or 78).

Upon actuation of the pair of the motor units 82 connected by their respective piston rods 82a (FIGS. 2 and 8) to their respective stripper plate 84, the stripper plate and mounted stripper rings 84a are moved downwardly to strip the bottles from the respective molds. This downward movement of the stripper mechanism occurs only after movement of the bottom end walls of the body mold portions out of interfering relation, and opening of the respective neck mold portions 22 or 24, as will be hereinafter described in detail.

Figure 2:
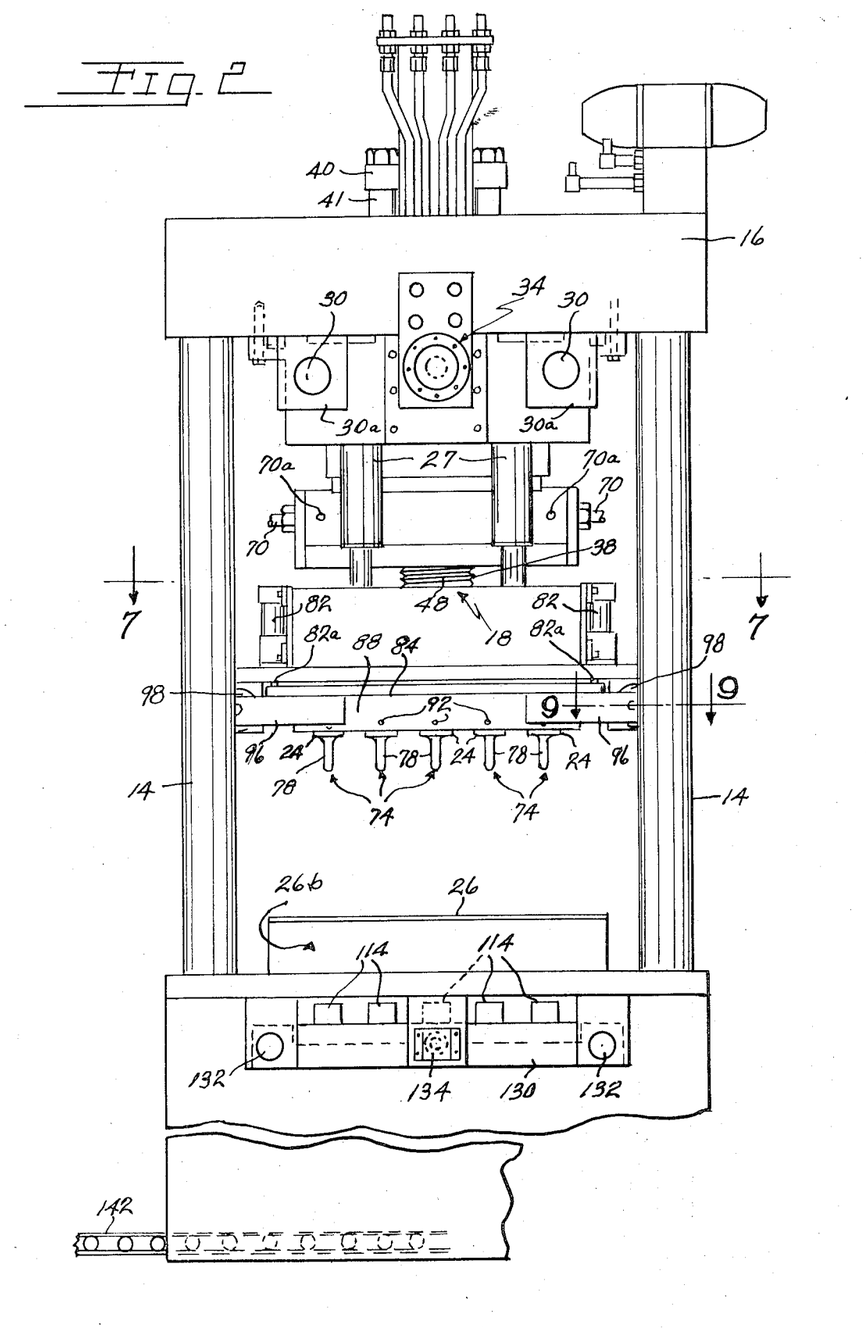
FIG. 2 is a partially broken side elevation of the machine illustrated in FIG. 1.
Figure 8:
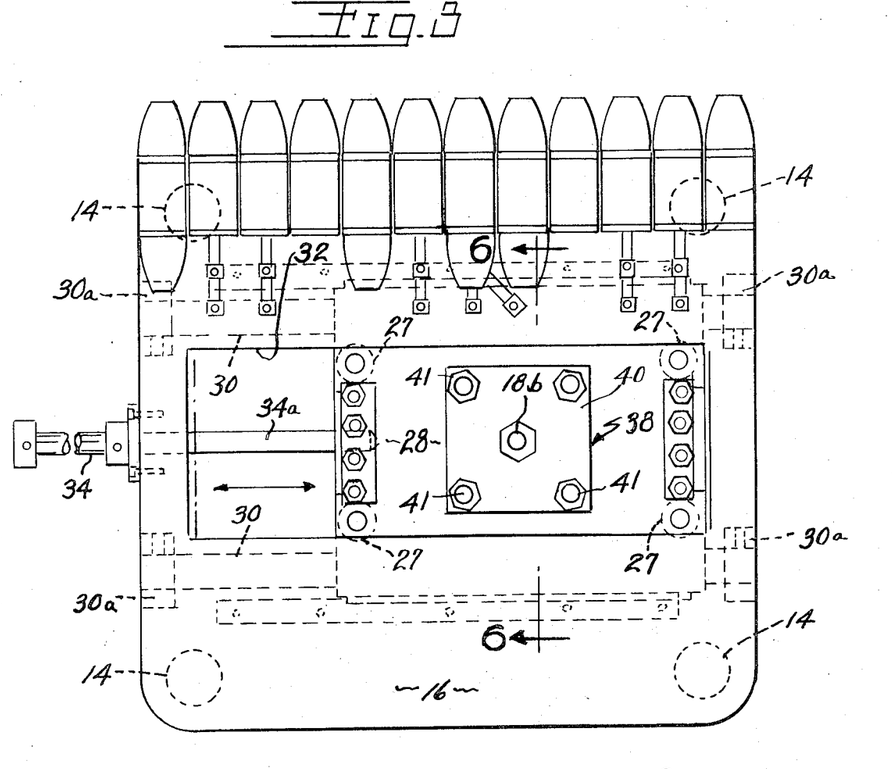
FIG. 8 is an enlarged, fragmentary sectional view taken generally along the plane of line 8—8 of FIG. 7.
Figure 9:
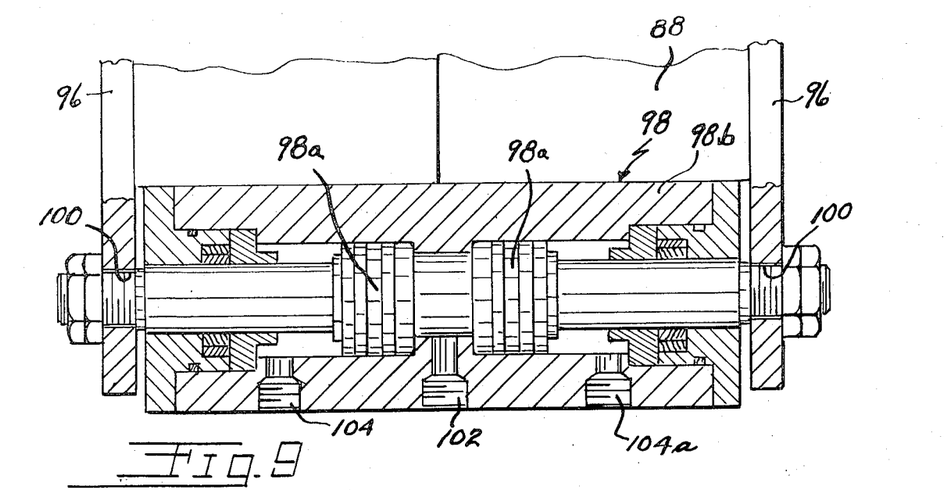
FIG. 9 is an enlarged, fragmentary, sectional view taken generally along the plane of line 9—9 of FIG. 2, looking in the direction of the arrows and illustrating the power means for opening and closing the neck mold portions of the molds.

Sectional neck ring holder member 88 (FIGS. 2 and 8) is provided for mounting the respective, preferably removable neck mold portions 22 and 24. Neck mold portions 22 annd 24 are secured to the respective holder member 88 as by means of threaded fasteners 92 (FIGS. 2 and 8). Each neck ring holder member 88 and the associated neck mold portions are split lengthwise thereof as at 94 (FIG. 8) for expansible or opening movement to permit stripping of the bottles from the blowing station molds after completion of the forming operation. In this connection, each end of the neck ring holder member is provided with end plates or brackets 96 secured thereto and a pair of fluid powdered, double acting motor units 98 (FIGS. 2 and 9) are provided, mounted on each end of the movable platen 20, and which coact with the plates 96 for moving the associated neck ring holder member and attached neck mold sections 22 or 24 laterally outwardly with respect to one another. In this connection, referring to FIG. 9, it will be seen that the motor units 98 each comprises a pair of pistons 98a with the piston rods thereof extending outwardly of opposite ends of the cylinder 98b and which are received through openings 100 in the end plates, and are secured to the end plates, for moving the end plates laterally outwardly and thus moving the neck ring holder sections and attached neck ring mold portions outwardly, for opening the neck forming section of the mold. It will be seen that application of fluid pressure to port 102 in cylinder 98b will cause the pistons and associated piston rods to move laterally outwardly with respect to one another, while application of fluid pressure to ports 104, 104a will cause the piston rods to move toward one another. When the fluid powered units 98 are actuated so as to open the neck ring holder and attached neck mold portions, clearance as at 106 (FIG. 8) is then provided for downward movement of the stripper plate 84 and attached stripper rings 84a, to strip the molded article from the mold.

Figure 4:
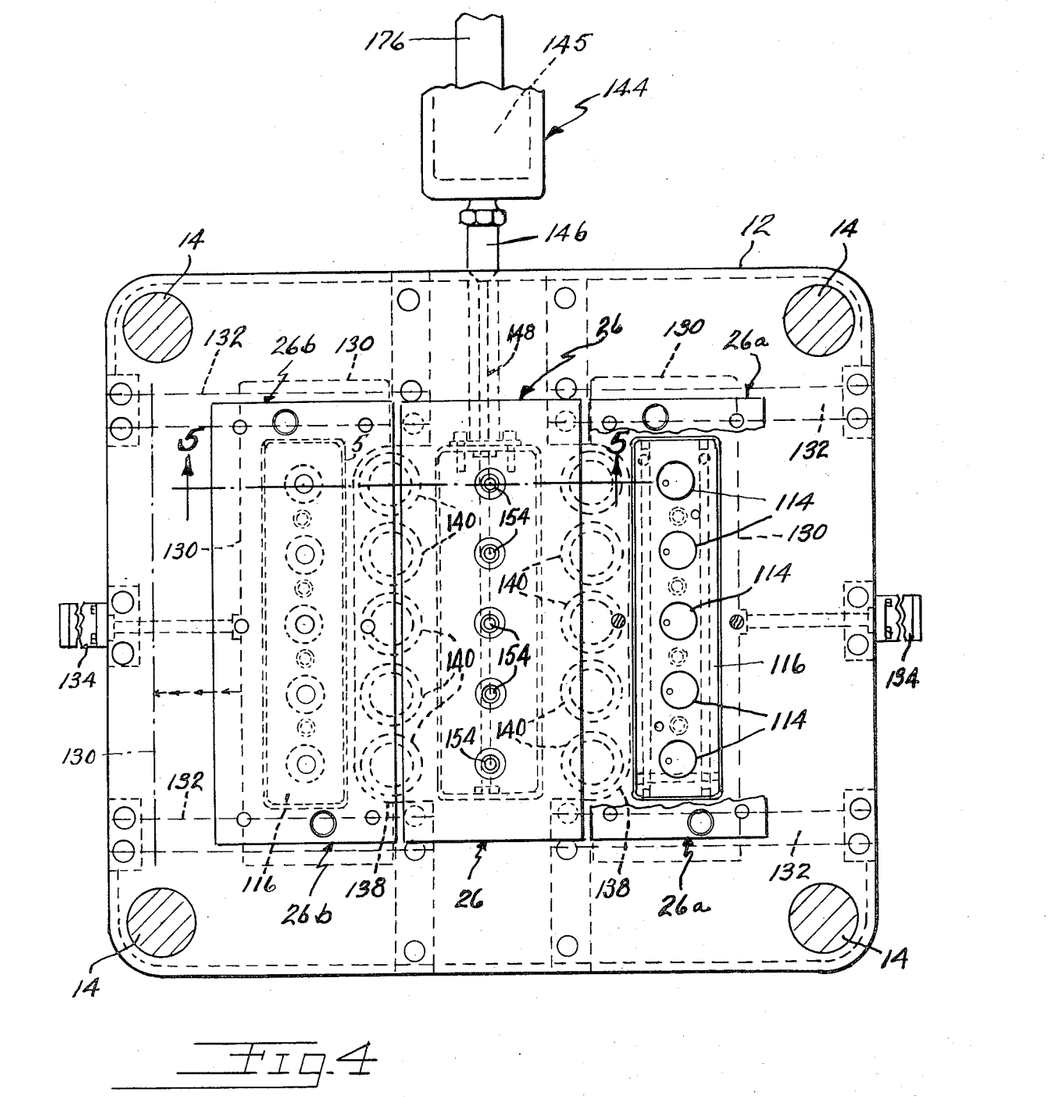
FIG. 4 is an enlarged sectional view taken generally along the plane of line 4—4 of FIG. 1 looking in the direction of the arrows.
Figure 5:
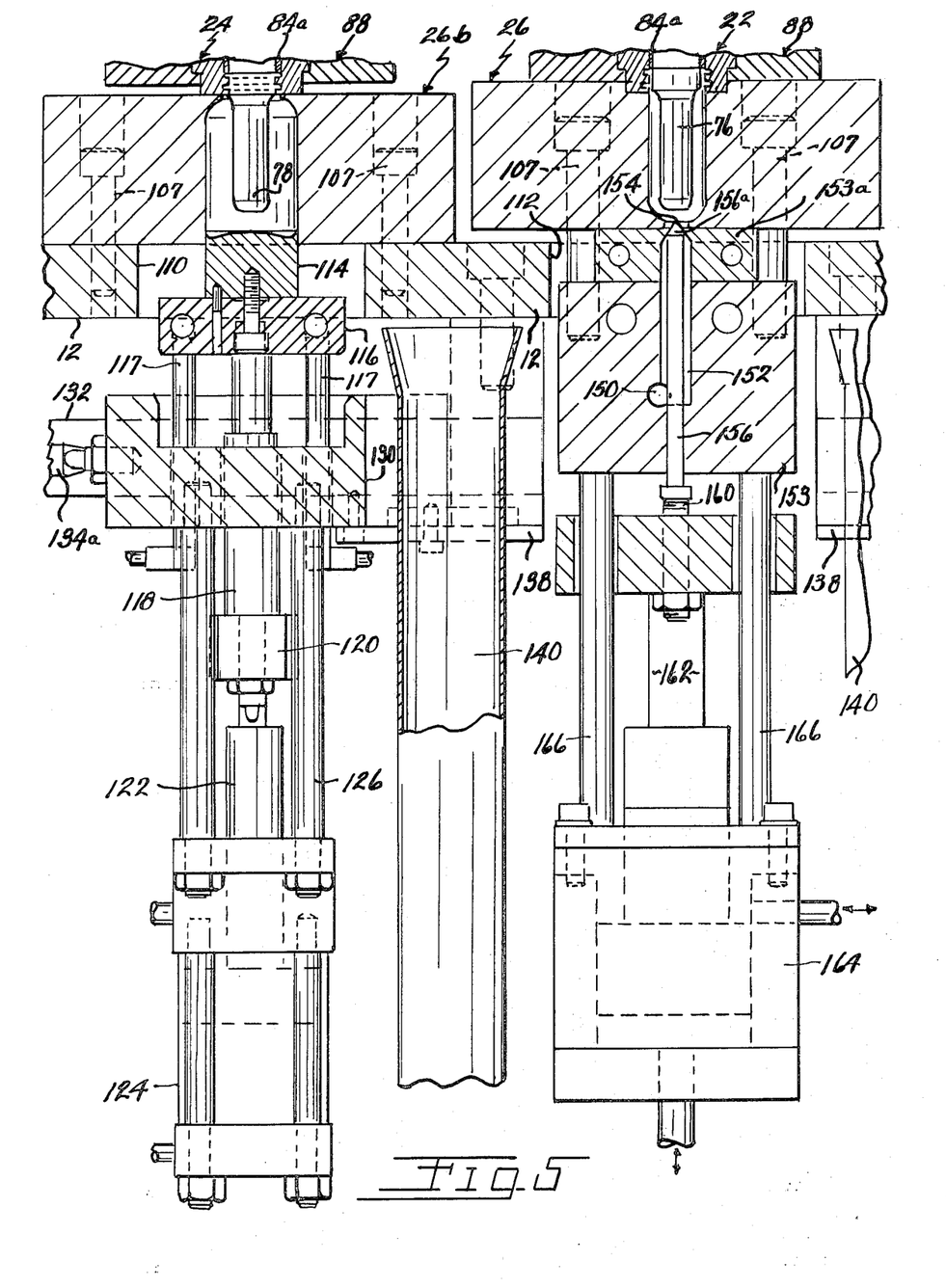
FIG. 5 is an enlarged, fragmentary sectional view taken generally along the plane of line 5—5 of FIG. 4 looking in the directions of the arrows, and illustrating particularly the movable bottom or end wall portion of each mold cavity on one of the blow molds, the injection arrangement for injecting plastic stock material vertically into the parison mold, and the chute means which coacts with the movable end wall portions of the blow mold upon opening of the blow mold for directing the molded or formed articles to a desired location.

Referring now in particular to FIGS. 4 and 5, there is illustrated the mechanism for closing the bottom of the body portions of the blow molds, and thus forming the bottom wall of the blown bottle. Mold portions 26, 26a, 26b may be secured to the bed plate 12 as by means of bolts 107 (FIG. 5). The bed plate 12 underlying the blow mold portions 26a, 26b is provided with opening 110, and underlying the parison mold portion 26 is provided with opening 112. The bottom end wall mold portion 114 (FIGS. 2 and 5) of each blow mold cavity is mounted on a platform plate 116. Fluid conveying lines 117 may supply cooling fluid to and from the respective plate 116. Support plate 116 is supported by means of stem structure 118 which in turn is attached by means of adjustable mechanism 120 to the piston rod 122 of a double acting, preferably fluid-powered motor unit 124. Motor unit 124 is operative to raise and lower platform plate 116 and, therefore, open and close the end of the body blow mold portions 26b and 26a. Motor unit 124 may be supported by means of tie rods 126 to generally horizontally extending support member 130.

Support member 130 is mounted for horizontal shifting movement on guideways 132 and may be actuated in such movement by means of a preferably double acting, fluid-powered motor unit 134 secured to frame 10. Actuation of motor unit 134 will shift the support member 130 from a position wherein the end wall portion 114 of the blow mold section underlies the associated body mold portion 26b or 26a, laterally outwardly after the respective motor unit 124 has been actuated to lower the end wall portion 114 from coaction with the mold cavity. Mounted on support member 130 as by means of apertured plate 138 (FIG. 5) are a plurality of chutes 140, each of which is adapted to underlie a respective blow mold cavity in the respective body mold section 26b or 26a, when the end wall portions 114 are shifted laterally outwardly as aforedescribed.

Thus when the bottle is stripped from the mold by the stripper assembly 80, the bottle will be directed by the respective chute downwardly. A powered conveyor mechanism 142 (FIGS. 1 and 2) may be provided in underlying relationship with the chutes 140, for receiving the bottles thereon and transporting them to any desired location for further handling.

Referring now to FIGS. 4 and 5, a plastic injection assembly 144 is provided, including an extruder head having a reciprocal and rotatable extruder screw 145 and an injection nozzle 146, for injecting hot plastic material into passageway 148 formed in the machine frame, which passageway 148 opens at a port 150 (FIG. 5) which communicates via vertical passageway 152 in feeder block 153 with an opening 154 in the bottom of the respective parison mold cavity, for furnishing the plastic to the parison mold for forming the parison. A shut-off pin 156 coacts with each respective vertical passageway 152 for cutting off the flow of plastic into the respective parison mold. The cut-off pin is tapered as at 156a at its leading end, for coaction with a complementary tapered surface of the feeder head 153a for effectively shutting off the flow of plastic. Pins 156 are coupled as by means of adjustable mechanism 160 to piston rod 162 of double acting, preferably fluid powered motor unit 164 which is supported as by means of tie rods 166 in depending relationship from feeder block 153.

Figure 10:
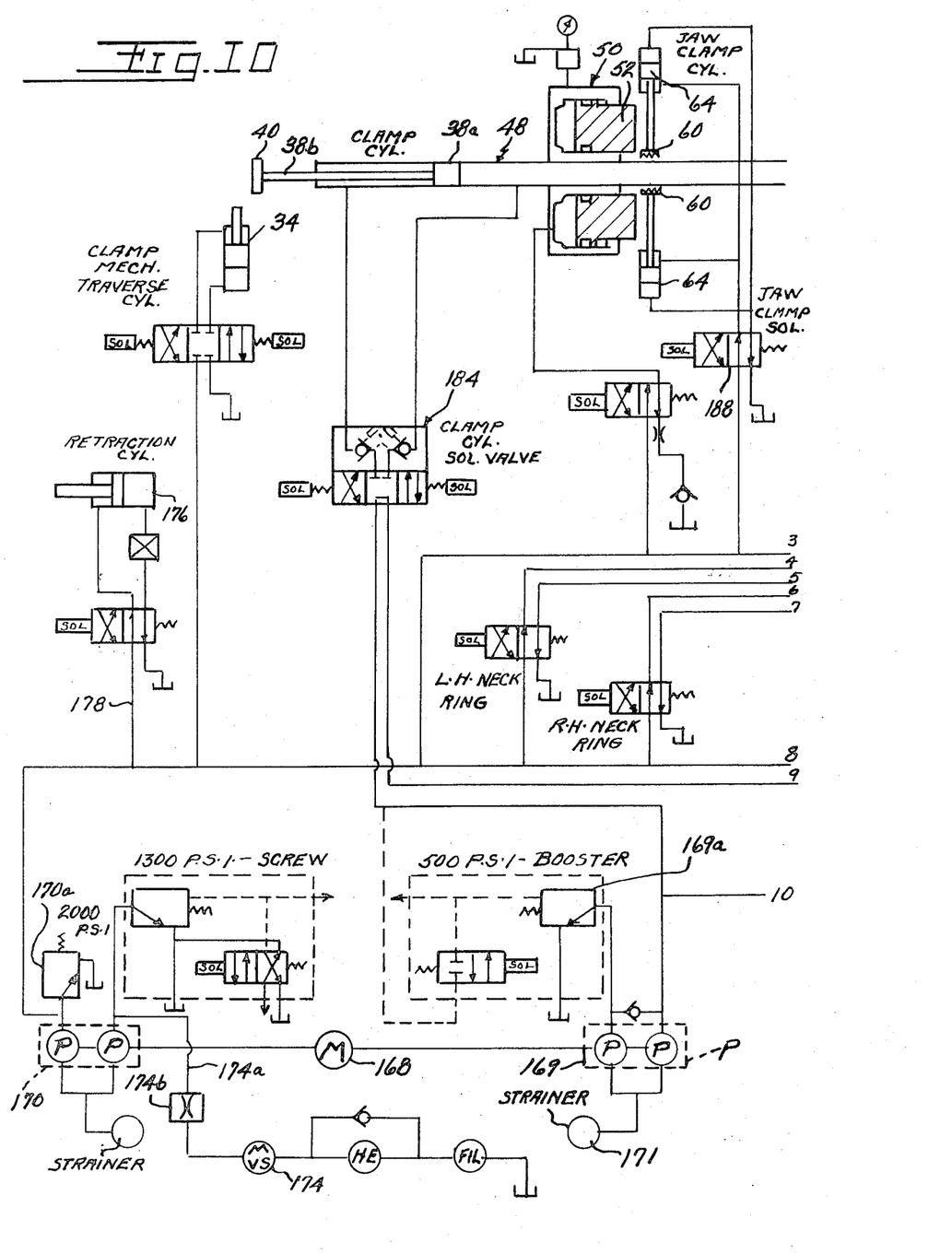
FIGS. 10 and 10A are a schematic of the hydraulic circuitry and associated control valves for operating the fluid powered motor units of the hydraulic circuitry, that may be used to control the various movable components of the machine.
Figure 10A:
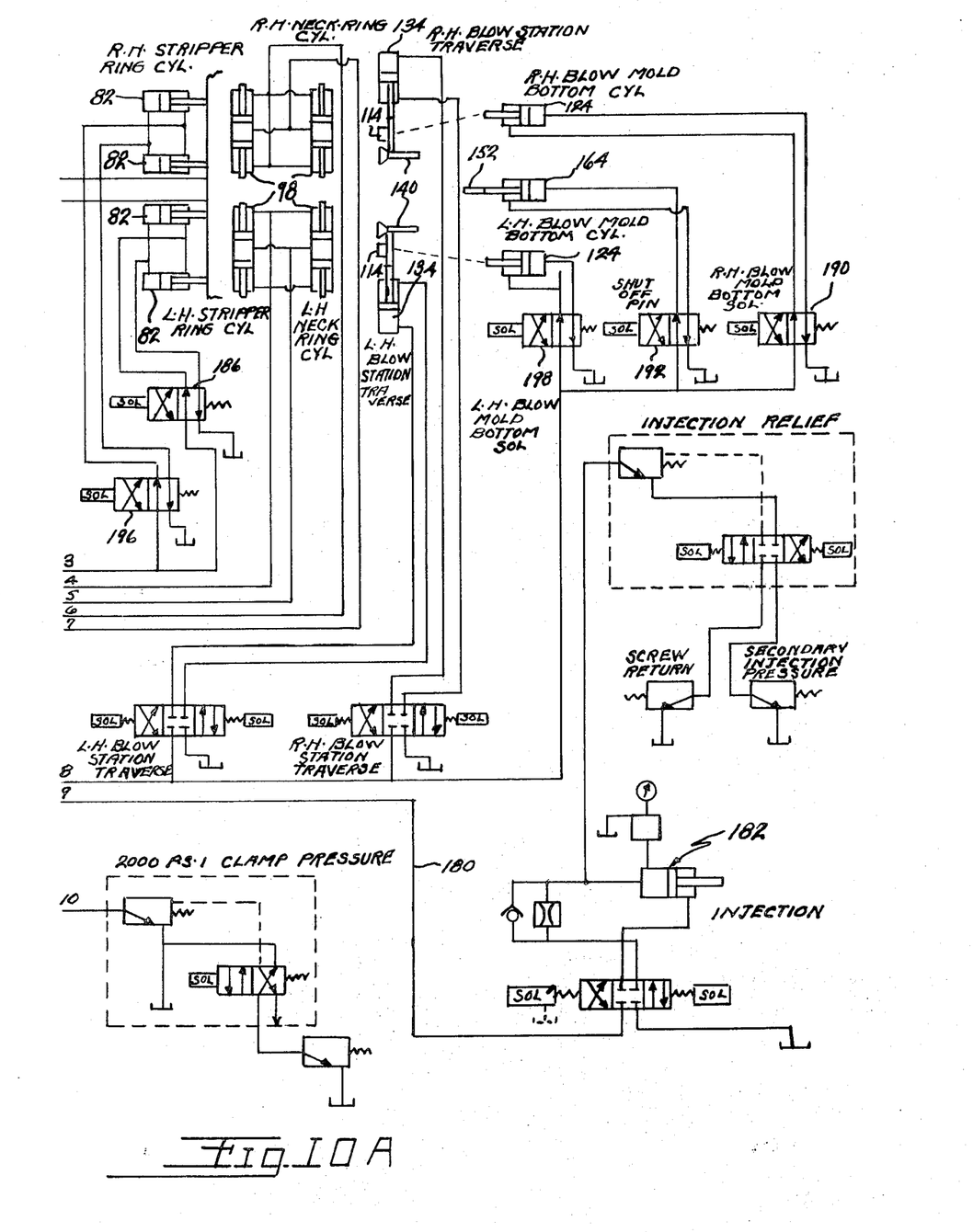

Referring now to FIGS 10 and 10a, which illustrate a schematic of the fluid powered controls for the machine, the operation of the machine may be as follows: An electric motor 168 (FIG. 10) may be provided on the molding machine and operatively connected to pressure pump section 169 and pressure pump section 170 for actuating the latter sections. Pressure pump sections 169, 170 may include relief valves 169a, 170a for directing the hydraulic fluid back to tank, and may also include conventional oil strainers 171. A fluid powered rotary motor unit 174 (FIG. 10) may be coupled as by means of line 174a including flow control valve 174b to the pump section 170 for powering the motor unit 174 in its operation of rotating the screw 145 of the extruder mechanism during plasticizing and heating of the plastic stock material. Reciprocal, double acting preferably fluid powered motor unit 176 (FIGS. 4 and 10) may be coupled as by means of line 178 to pump section 170, for selectively moving the nozzle 146 of the extruder mechanism into and from coaction with feeder tube 148, and line 180 (FIG. 10A) may couple fluid powered motor unit 182 (FIG. 10A) to the source of pressurized fluid for furnishing the powered linear injection movement of the screw 145 for forcing the plastic stock material into the feeder tube 148 and thus into the parison mold 26.

Figure 1:
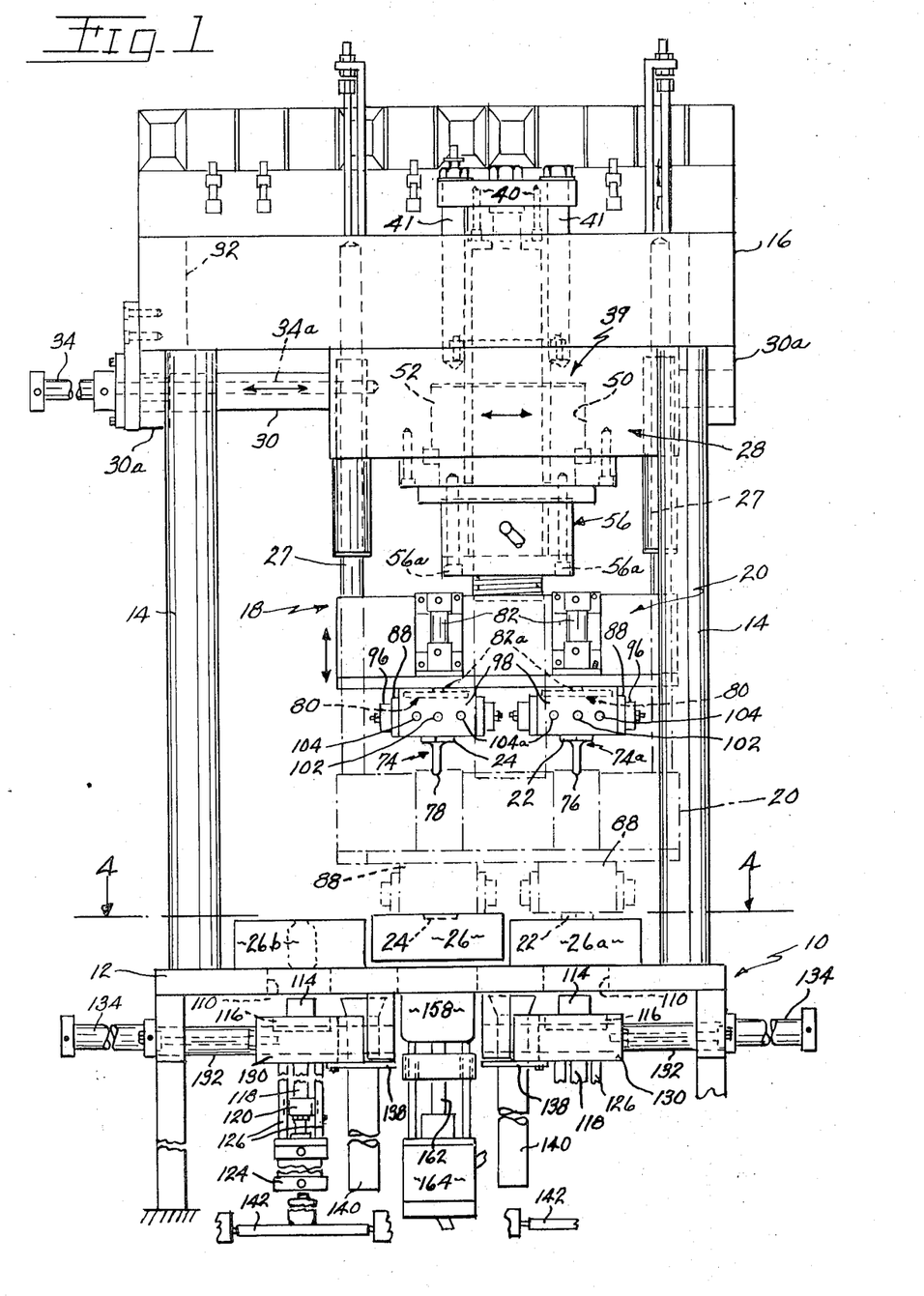
FIG. 1 is a front elevational partially broken illustration of a parison-type molding machine which may be utilized to perform the method of the invention.

With the machine in the right-hand position as shown in FIG. 1, the neck ring mold sections 22, 24 are in closed position, and when the cycle start button (not shown) is depressed, the clamp cylinder solenoid valve 184 (FIG. 10) is actuated causing fluid pressure to be applied via port 186 (FIG. 3) to the passage 38c in piston rod 38b and thus to the cylinder 48, thus moving the movable platen 20 and associated neck ring mold holders 88 and neck ring mold sections 22, 24 toward the bed 12, and toward the parison mold 26 and the blow mold body portion 26a to close the molds. The neck ring power cylinders 98 (FIGS. 1, 2 and 9) are in holding position or in other words maintaining the neck ring mold sections in closed condition. The molds are thus closed and the jaw clamp solenoid valve 188 is then actuated, causing the jaw power units 64 to move inwardly and clamp the jaws 60 (FIG. 6) to the serrated exterior of cylinder member 48 of primary actuating or closing unit 38, thus tying the secondary actuating or clamping unit 39 to the primary unit 38. At this point, the right-hand blow mold bottom solenoid valve 190 (FIG. 10A) is actuated applying actuating fluid to the right-hand blow mold bottom cylinder 124, thus causing the bottle end wall members 114 for the right-hand blow mold portion 26a to be held in place for the blowing operation.

The reciprocal screw plasticizer unit 144 is then actuated including actuation of injection cylinder 182, and the plastic manifold shutoff pin cylinder 164 (FIG. 5) is actuated via solenoid valve 192, causing the shutoff pins 156 to open, and the plastic flows from the passageways 152 vertically upwardly into the respective parison cavity of parison mold 26.

While the parison mold cavities are being filled with plastic, the following takes place in the right-hand blow mold portions 26a. The neck mold sections 22 are held in closed condition by the cylinders 98, and the stripper plate 84 and associated stripper rings 84a are in "up" position as shown for instance in FIG. 8. The right-hand blow station traverse cylinder 134 maintains the bottom end wall sections 114 of the blow mold station 26a positioned in underlying relation with respect to the associated body mold portions with the bottom or end wall portions 114 being maintained in "up" position by the right-hand vertically acting power unit 124.

Almost immediately after the clamping mechanism 18 has closed the molds and applied the high pressure from secondary unit 39 thereto, the core rod air control is actuated causing pressurized air to be applied to the air passages in core rods 76, thereby causing the bottles to be blown. Air entering the core rods and moving downwardly through the passages therein in the conventional manner forces the plastic on the parisons disposed in the righthand blow molds outwardly against the walls of the mold cavities. Upon completion of the blowing operation, the right-hand bottle bottom cylinder 124 (FIG. 10A) is actuated and goes to the "down" position, thereby lowering the ends or bottom walls 114 as a unit out of their respective blow mold cavities.

The righthand blow station traverse cylinder 134 is then actuated and shifts the chutes or tubes 140 into underlying relationship with respect to the open bottom mold section 26a while at the same time shifting the bottom end walls 114 out of interfering relationship with respect to the respective blow mold cavity. The right hand neck ring cylinders 98 are then actuated to laterally open the neck ring mold sections 22. The right hand stripper cylinders 82 are then actuated, thus causing downward movement of the stripper plate 84 and associated rings 84a, to strip the formed bottles from their respective mold cavity and off the associated core rod 76. The bottle thus falls down through the respective chute 140 to the desired location, such as for instance, onto conveyor 142 to be carried to a predetermined position for further handling. Since the bottom or end wall portion 114 of the respective mold cavity of the right hand mold is out of interfering relation as shifted by the associated motor unit 134, the bottles move without interference from the mold cavity down through the chute onto the conveyor. Thereafter, the stripper mechanism 80 is actuated via valve 196 to return the stripper to "up" position, and the right hand neck rink cylinders 98 are actuated to close the neck ring mold sections. All this happens while the hot plastic stock is being injected into the central parison mold 26 for formation of the parisons. It will be noted that the neck section of the bottle is formed at the parison mold and that the body section of the bottle is completed at the blow station.

The manifold shut off pins 152 are then actuated by means of power unit 164, to cut off the flow of plastic to the parison mold station. At this time, the clamp jaw cylinders 64 are actuated to move the clamp jaws 60 away from interlocking coaction with the cylinder 48 of the primary actuating unit 38 of the clamping assembly. This disconnects the secondary actuating unit 39 from the primary actuating unit, and then the primary actuating unit is actuated by application of fluid pressure to port 43 (FIG. 6) to cause upward movement of cylinder 48 and thus movement of the clamp toward open position. The clamp mechanism traverse cylinder 34 (FIGS. 1 and 10) is then actuated and the clamp mechanism 18 and supported neck mold sections 22, 24 shifts to the left hand position, with core mold assemblies 74 being disposed above the left hand blow station 26b and the core mold assemblies 74a being disposed above the parison mold station 26. The primary closing cylinder 38 of clamping mechanism 18 is then actuated to cause closing of the molds. The neck ring cylinders 98 are in holding position, thus maintaining the neck mold rings 22, 24 in closed condition. Solenoid valve 188 (FIG. 10) is then actuated to cause the jaw clamp cylinders 64 to move the jaw clamps 60 into holding coaction with the exteriorly serrated cylinder 48 of the primary actuating unit 38. At this point, the bottle bottom cylinder solenoid valve 198 is actuated causing the left hand bottle bottom cylinder 124 to move the end or bottom walls 114 into place in the respective body mold cavity of the left hand blow mold station 26b, for the blowing operation. Screw plasticizer unit 144 is then actuated and the manifold shutoff pin cylinder solenoid 192 is actuated causing the shutoff pins 152 to open, and thus permit plastic stock material to flow into the parison mold station cavities.

While the parison molds are being filled, the following takes place in the left hand blow station 26b. The neck ring mold sections 24 are maintained in closed position by cylinders 98; the left hand stripper mechanism is in the "up" position, and the left hand blow station traverse cylinder 134 is in the blow position (i.e. with the bottom wall sections 114 closing the mold cavities). Almost immediately after the clamp mechanism closes the molds, the core rod air shut off is mechanically actuated, applying pressurized air to the air passages in core rods 78, thereby causing the bottles to be blown.

Upon completion of the blowing operation of the bottles at the left hand blow station, the left hand bottle bottom cylinder 124 is actuated to lower the end walls 114 to "down" position, and the left hand neck ring cylinders 98 are actuated to open the neck ring mold sections 24. The left hand blow station traverse cylinder 134 is then actuated, and shifts the end walls 114 and associated conveyor tube assembly 140, whereby each of the tubes is disposed beneath the open end of the respective blow mold body cavity. The left hand stripper ring cylinders 82 are then actuated as controlled by solenoid valve 186, to thus cause lowering of the stripper mechanism and stripping of the formed bottles from the mold cavities of the left hand blow station.

After the stripper mechanism returns to "up" position, the neck ring mold sections 24 at the left hand blow station are reclosed. All this happens while the plastic stock material is injected by injection mechanism 144 into the parison mold. The plastic manifold shutoff pins are then actuated by the cylinder 164 to shutoff position, to stop the flow of plastic. The clamp jaw cylinders 64 are then actuated and move away from the cylinder 48 of the primary actuating unit 38 of the closing and clamping mechanism, and the primary actuating unit 38 is actuated to move the cylinder 48 axially upwardly thus opening the clamp. The clamp mechanism traverse cylinder 38 is then actuated to shift the clamp mechanism and associated neck ring mold sections to the right hand position. This then completes the full cycle.

From the foregoing description and accompanying drawings it will be seen that the invention provides a novel blow molding method in which ejection of the formed articles from the machine is accomplished vertically, resulting in a machine requiring less floor space while still operating to provide for molding articles having a configured or threaded neck section, and also conveniently providing for an indented end wall or bottom wall section. The molds forming the molded article comprise a horizontally or laterally expandible neck mold portion for forming the neck section of the molded article and a body mold portion for forming the body section of the molded article, with the body mold portion of the blow mold including a movable end wall defining the bottom of the body section of the molded article, with ejection of the molded article from the blow mold occurring vertically after movement of the movable end wall out of interfering relation. A chute arrangement may be also provided for receiving the ejected bottles or molded articles from the open ended blow mold and directing the articles to a predetermined location such as for instance a conveyor, for conveying the articles away from the machine. Ejection of the plastic stock material into the parison mold for forming the parison may be accomplished vertically. The resultant operation is highly compact requiring a minimum of floor space.

The terms and expressions which have been used are used as terms of description and not of limitation, and there is no intention in the use of such terms and expressions of excluding any equivalents of any of the features shown or described or portions thereof, and it is recognized that various modifications are possible within the scope of the invention claimed.

I claim:

1. In a method for blow molding hollow articles, such as plastic bottles having a configured neck section and a substantially smooth surfaced body section, comprising, molding a parison on a vertically oriented core rod means in a parison mold, transferring the core rod means and formed parison from the parison mold into a vertically oriented laterally disposed blow mold, each said mold comprising upper and lower mold portions with one of said mold portions defining an expandable neck like mold cavity configuration and the other of said mold portions defining a substantially smooth walled body mold cavity configuration, said blow mold having a movable single end wall section at the end thereof opposite to said expandable neck mold portion defining the total corresponding end of the blow mold cavity, blow molding the parison in the blow mold, moving said end wall section laterally relative to the blow mold cavity out of interfering relation with the whole blow mold cavity and concurrently with said movement of said end wall section moving an article receiving chute laterally into underlying alignment with the open-bottomed blow mold cavity, expanding said neck mold portion to release the blown article only from said neck mold portion, and then ejecting the molded article vertically downwardly off the core rod means and from the open-bottomed body mold cavity into said chute while maintaining said body mold cavity configuration stationary relative to said chute.

2. A method in accordance with claim 1 including injecting stock material vertically into said parison mold to form said parison on said core rod means.

3. A method in accordance with claim 2 including the step of cutting off the vertical flow of plastic stock material into the parison mold by means of a vertically movable pin adapted for coaction with a seat circumscribing the stock entry opening into said parison mold.

4. A method in accordance with claim 2 wherein a pair of blow molds each one of which has a movable end wall section and an expandable neck mold portion, are disposed on opposite sides of the parison mold, providing a pair of vertically and laterally shiftable core rod means, and alternately projecting said core rod means simultaneously into pairs of adjacent molds one of which is always said parison mold for blow molding of an article in the blow mold while forming a parison in the parison mold.

5. A method in accordance with claim 4 wherein said core rod means is sequentially shifted upwardly, laterally and downwardly with respect to said molds and from positions within one blow mold and parison mold to positions within the parison mold and the other blow mold each time the end wall section of the respective blow mold is moved to open the blow mold cavity.

6. A method in accordance with claim 2 wherein said neck mold section is separable from the body portion of the mold, and including moving said neck portion vertically into and from engaging coaction with said body portion to respectively close and open said mold.

7. A method in accordance with claim 2 wherein said chute is operably coupled to said end wall section and moving said end wall section vertically downwardly away from the body mold cavity of the blow mold to open the lower end of the blow mold and then moving the end wall section and chute as a unit relative to the body mold cavity.

8. A method in accordance with claim 7 wherein the molded article is ejected from the mold cavity by forcibly pushing the molded article vertically downwardly relative to the core rod means and out of the body mold cavity by applying vertical pressure to the neck section of the molded article after said end wall section is moved out of interfering relation and said neck mold portion is expanded away from the molded article.

9. A method in accordance with claim 7 including receiving molded articles from the chute when the latter is aligned with the blow mold cavity and then moving such received articles out of the area.

References Cited

UNITED STATES PATENTS

| | | | |
|---|---|---|---|
| 3,267,184 | 8/1966 | Nowicki et al. | 264—97 |
| 3,029,468 | 4/1962 | Valyi | 264—97 UX |
| 3,357,045 | 12/1967 | Ninneman | 264—97 X |
| 3,011,216 | 12/1961 | Cussoni | 264—97 |
| 3,337,667 | 8/1967 | Ninneman | 264—97 |
| 3,211,815 | 10/1965 | Cordiale et al. | 264—334 X |

JAN H. SILBAUGH, Primary Examiner

U.S. Cl. X.R.

264—334